US012331891B2

(12) United States Patent
Rebernik

(10) Patent No.: US 12,331,891 B2
(45) Date of Patent: Jun. 17, 2025

(54) SYSTEM HAVING AT LEAST TWO CRYOGENIC CONTAINERS FOR PROVIDING A FLUID

(71) Applicants: Cryoshelter LH2 GmbH, Dobl-Zwaring (AT); Cryoshelter BioLNG GmbH, Dobl-Zwaring (AT)

(72) Inventor: Matthias Rebernik, Dobl-Zwaring (AT)

(73) Assignees: Cryoshelter LH2 GmbH, Dobl-Zwaring (AT); Cryoshelter BioLNG GmbH, Dobl-Zwaring (AT)

( * ) Notice: Subject to any disclaimer, the term of this patent is extended or adjusted under 35 U.S.C. 154(b) by 440 days.

(21) Appl. No.: 17/756,508

(22) PCT Filed: Sep. 23, 2020

(86) PCT No.: PCT/AT2020/060342
§ 371 (c)(1),
(2) Date: May 26, 2022

(87) PCT Pub. No.: WO2021/102489
PCT Pub. Date: Jun. 3, 2021

(65) Prior Publication Data

US 2023/0003344 A1 Jan. 5, 2023

(30) Foreign Application Priority Data

Nov. 29, 2019 (AT) .......................... GM 50210/2019

(51) Int. Cl.
*F17C 7/02* (2006.01)
*F02D 19/02* (2006.01)
(Continued)

(52) U.S. Cl.
CPC .............. *F17C 7/02* (2013.01); *F02D 19/023* (2013.01); *F02D 19/027* (2013.01);
(Continued)

(58) Field of Classification Search
CPC .... F17C 7/02; F17C 13/02; F17C 2205/0326; F17C 2205/0332; F17C 2205/0142;
(Continued)

(56) References Cited

U.S. PATENT DOCUMENTS

2018/0313496 A1 11/2018 Garner et al.

FOREIGN PATENT DOCUMENTS

AU 2014344204 A1 * 5/2016 ............ F17C 13/004
DE 202019103696 U1 11/2019
(Continued)

OTHER PUBLICATIONS

International Search Report, mailed Dec. 16, 2020, from PCT/AT2020/060342 filed Sep. 23, 2020.

*Primary Examiner* — Kun Kai Ma
(74) *Attorney, Agent, or Firm* — Workman Nydegger

(57) ABSTRACT

The invention relates to a system for providing a fluid, comprising at least a first and a second cryogenic container for storing the fluid, wherein the system comprises a first retrieval line connecting to the first cryogenic container for retrieving a first mass flow (M1) of fluid and a second retrieval line connecting to the second cryogenic container for retrieving a second mass flow (M2) of fluid, wherein the system comprises means, which are configured to establish two mass flows (M1, M2) of different dimensions such that in a first operational mode a hold time of the two cryogenic containers converges upon retrieval and/or in a second operational mode the hold time of the two cryogenic containers essentially decreases at the same rate if the hold times of the two cryogenic containers are essentially equal.

15 Claims, 2 Drawing Sheets

(51) Int. Cl.
*F02D 41/00* (2006.01)
*F02M 21/02* (2006.01)
*F17C 13/02* (2006.01)

(52) U.S. Cl.
CPC ..... *F02D 41/0027* (2013.01); *F02M 21/0224* (2013.01); *F02M 21/023* (2013.01); *F17C 13/02* (2013.01); *F17C 2201/035* (2013.01); *F17C 2201/056* (2013.01); *F17C 2205/0142* (2013.01); *F17C 2205/0326* (2013.01); *F17C 2205/0332* (2013.01); *F17C 2221/033* (2013.01); *F17C 2223/0161* (2013.01); *F17C 2225/043* (2013.01); *F17C 2225/046* (2013.01); *F17C 2227/046* (2013.01); *F17C 2250/03* (2013.01); *F17C 2250/0426* (2013.01); *F17C 2250/043* (2013.01); *F17C 2250/0443* (2013.01); *F17C 2250/0673* (2013.01); *F17C 2260/021* (2013.01); *F17C 2265/066* (2013.01); *F17C 2270/0171* (2013.01)

(58) Field of Classification Search
CPC ........ F17C 2221/033; F17C 2223/0161; F17C 2225/043; F17C 2225/046; F17C 2227/046; F17C 2250/03; F17C 2250/043; F17C 2250/0426; F17C 2250/0443; F17C 2250/0673; F17C 2260/021; F17C 2265/066; F17C 2270/0171; F17C 2227/04; F02D 19/023; F02D 19/027; F02D 41/0027; F02M 21/0224; F02M 21/023
See application file for complete search history.

(56) References Cited

FOREIGN PATENT DOCUMENTS

EP 3093178 A1 11/2016
EP 3236133 A1 10/2017

* cited by examiner

SYSTEM HAVING AT LEAST TWO CRYOGENIC CONTAINERS FOR PROVIDING A FLUID

The invention relates to a system for providing a fluid, comprising at least a first and second cryogenic container for storing the fluid, wherein the first cryogenic container has a container volume, which is larger than a container volume of the second cryogenic container, and wherein the system further comprises a first retrieval line connecting to the first cryogenic container for retrieving a first mass flow of fluid and a second retrieval line connecting to the second cryogenic container for retrieving a second mass flow of fluid.

According to prior art, liquefied gases may be stored in containers ("cryogenic containers") to store these as fuels for, example, a motor. Liquefied gases are gases, which are present at boiling temperature in the liquid state of matter, wherein the boiling temperature of this fluid is a function of the pressure. If such a cryogenic liquid is filled into a cryogenic container, then, apart from thermal interactions with the cryogenic container itself, a pressure will be set according to the boiling temperature. In the case of the use of, for example, methane as fuel, this means that the methane has to be present at a sufficiently high temperature to reach a sufficiently high tank pressure required for the operation of a motor after refilling from the petrol station into the vehicle tank. If the pressure applied to the injection valves of the motor falls below the minimum specified, then operation of the motor will not be possible.

In operation, if the fluid is retrieved from the container and supplied to the motor, the fluid is present in the cryogenic container, hence, having an operating pressure, which is, for example, between 6 and 8 bar. In the case of a shut-off of the system and termination of retrieval, the pressure in the cryogenic container again will increase due to the heat flow into the fluid. In order for the pressure in the cryogenic container not to become too high and to prevent a damage or accidents, respectively, the cryogenic container is equipped with a pressure control valve, which is activated at a predetermined pressure. The period of time from the termination of retrieval at the operating pressure until reaching the predetermined pressure of the pressure control valve is designated by those skilled in the art as "hold time".

If the hold time is exceeded, the pressure control valve will be activated and the fluid will be discharged such that further pressure increase will be prevented. Discharging the fluid, however, constitutes economic loss, on the one hand-side, as fuel will escape unused, and—on the other hand—an environmental problem, as storage efficiency will decrease and methane will be discharged into the ambience. For this reason, it is desirable that the hold time of the cryogenic container be as long as possible in order to enable long shut-off periods.

Furthermore, there has been known from prior art to mount two cryogenic containers on a motor vehicle, wherein the fluid is used as fuel for the motor vehicle. The cryogenic containers are usually mounted to the left and to the right at the support frame of the vehicle between axles of the vehicle.

Due to the different space available on both sides of the motor vehicle, it may be useful to use two cryogenic containers having different container volumes, for example one shorter and one longer cryogenic container. A problem that arises, however, is that cryogenic containers having different container volumes will have different hold times. The "total" hold time of the system is therefore calculated from the cryogenic container having the shorter hold time.

A rather obvious solution would be, for example, to better insulate the cryogenic container having the smaller container volume, which typically has a shorter hold time, in order to reduce the heat flow into the fluid. This would make it possible to have cryogenic containers having a similar hold time. However, this solution is very inflexible as the cryogenic containers have to be precisely matched.

In systems with two cryogenic containers of equal dimensions, the same mass flow is usually retrieved from both cryogenic containers. Also in this case it may be, due to external influences or maladjustments of the system, that there is a different amount of fluid in both cryogenic containers such that both containers have a different hold time. This, in turn, will result in the "total" hold time of the system not being optimal at all times.

It is thus the task of the invention to provide a system with at least two cryogenic containers for providing a fluid, which overcomes the disadvantages mentioned.

This task is solved by a system for providing a fluid, comprising at least a first and a second cryogenic container for storing the fluid, wherein the first cryogenic container has a container volume larger than a container volume of the second cryogenic container and wherein the system further comprises a first retrieval line connecting to the first cryogenic container for retrieving a first mass flow of fluid and a second retrieval line connecting to the second cryogenic container for retrieving a second mass flow of fluid, wherein the system comprises means, which are configured to establish two mass flows of different dimensions such that in a first operational mode the hold time of the two cryogenic containers converges upon retrieval and/or in a second operational mode the hold time of the two cryogenic containers essentially decreases at the same rate if the hold times of the two cryogenic containers are essentially equal, wherein the hold time is the period of time from a termination of retrieval until that point of time, when the pressure in the cryogenic container reaches a predefined threshold.

The solution according to the invention solves the problem initially mentioned by balancing the different hold times of the cryogenic containers through the different retrieval of the fluid from the containers. With the solution according to the invention, it is thus possible to increase the hold time of the entire system consisting of both cryogenic containers without making structural changes to one of the two containers.

The first operational mode has the effect that the hold time of the two cryogenic containers is approximated such that all in all the hold time of the entire system increases, which is defined by the shorter hold time of the two cryogenic containers. The second operational mode has the effect that after reaching the same hold time of the two cryogenic containers for the first time, the hold time of the entire system decreases as little as possible upon further retrieval of fluid. It is also possible to equip the system only with the second operational mode, for example if the two cryogenic containers are filled in such a way that they have the same hold time.

In the case of cryogenic containers having a container volume of equal size, the solution according to the invention may be used in particular if the retrieval lines have different line lengths or, more generally, different flow losses. In this case, the means or a control unit of the means, respectively, may control the mass flows in such a way that the different flow losses are balanced.

Preferably, the first cryogenic container has a container volume, which is larger than a container volume of the second cryogenic container. In this embodiment, the solution according to the invention may be used in a particularly preferred manner, as the hold time of the cryogenic containers will generally be different and not only when the hold time of the two cryogenic containers becomes different due to external circumstances. In this embodiment, it is particularly preferred that, for example, the first operational mode is started directly after the tank has been completely filled—and particularly preferably after the operating pressure in the cryogenic containers has been reached—and the second operational mode is started after an equally long hold time has been reached.

In the simplest case, the first operational mode could be implemented by providing a rigid throttle in the first retrieval line such that the hold time of the two cryogenic containers converges upon retrieval of the fluid from both cryogenic containers. However, it is preferred that the means comprise a control unit, which is configured to regulate the first and/or the second mass flow. In this way, dynamic control of the hold time may be achieved depending on the current hold time or the fill level of the cryogenic containers, respectively.

In this embodiment, it is advantageous that the control unit is configured to essentially only retrieve fluid from the first cryogenic container in the first operational mode until the hold time of the first cryogenic container essentially corresponds to the hold time of the second cryogenic container. In the simplest case, this may be achieved by an on/off valve in the first or second retrieval line, respectively, which is controlled by the control unit.

Alternatively, a further improvement may be provided in that the control unit is configured to retrieve substantially only such an amount of fluid from the second cryogenic container in the first operational mode that the hold time of the second cryogenic container remains constant, and to retrieve the remaining fluid from the first cryogenic container. This allows the hold time of the second cryogenic container not to decrease while the majority of the fluid is retrieved from the first cryogenic container.

In the embodiment last mentioned, it is further preferred that the system is configured to retrieve in the first operational mode fluid from the second cryogenic container only in a gaseous state. This has the effect that less mass has to be removed from the second cryogenic container in order to maintain the hold time constant.

In all embodiments, it is preferred that the control unit is configured to switch from the first into the second operational mode after an equal hold time of the two cryogenic containers has been reached for the first time. In this way, there may be obtained a system that controls the hold time of the two cryogenic containers as efficiently as possible.

Furthermore, it is preferred that the control unit is configured to select between a retrieval of the fluid in a liquid phase and/or a retrieval of the fluid in a gaseous phase when retrieving the fluid from the first and/or the second cryogenic container. This can be provided for both the first and the second operational mode. In normal operation, the fluid is retrieved in the liquid phase. However, if the pressure exceeds the desired operating pressure, fluid may be retrieved in the gaseous phase. In this way, a so-called economiser function may be achieved, taking into account the hold time.

Further preferably, a third operational mode may be provided, wherein the system in the third operational mode is configured to establish a different operating pressure in the two cryogenic containers during operation and to retrieve fluid only from the first or only from the second cryogenic container. Preferably, the smaller one of the cryogenic containers is reduced to the lower operating pressure and fluid is only retrieved from the larger cryogenic container if an expected required power of the system is above a threshold, and fluid is only retrieved from the smaller cryogenic container if the expected required power of the system is below the threshold. Further preferably, an expected travel distance profile may be used to determine the required power. Due to these measures, the usable content of the cryogenic containers may be further increased, as by lowering the operating pressure in one of the cryogenic containers to a level at which the system can only support a low engine power, the hold time of this cryogenic container may be extended.

Further, the system may be transferred into a fourth operational condition if the pressure in both cryogenic containers is between an operating pressure and the threshold mentioned, and wherein the system in the fourth operational mode is configured to select the two mass flows such that the pressure in both cryogenic containers is reduced to the operating pressure while the hold time of the two cryogenic containers converges and/or increases at substantially the same rate upon retrieval. In this way, an operational mode may be achieved that is selected immediately after starting the system, i.e. in the embodiments mentioned above even before the first or second operational mode. The fourth operational mode allows for the pressure in the cryogenic containers to be reduced to the operating pressure, taking into account the hold time.

In the fourth operational mode, it is further preferred that fluid is only retrieved from the cryogenic containers in the gaseous phase, as this allows the operating pressure to be reached as quickly as possible. However, it may also be provided that the fluid is retrieved from one of the cryogenic containers in the gaseous phase and from the other cryogenic container in the liquid phase, for example if this helps the hold time to converge more quickly.

On the one hand, the control unit could regulate the mass flows according to a stipulated scheme, e.g. control the on/off valve mentioned after a predetermined time, whereby the first operational mode may be achieved. Preferably, however, the control unit comprises a computing unit, which is configured to calculate the current hold time of the first and/or the second cryogenic container and to control the mass flows on the basis of the calculated hold time. This can be done, for example, by measuring a current fill level and/or a current pressure in the cryogenic container in order to determine the current hold time on the basis thereof. A calculated hold time has the advantage that the control of the mass flows may be carried out more precisely and thus an improved hold time of the entire system may be achieved.

Furthermore, the control unit may be configured to determine the current hold time of the first and/or the second cryogenic container from pre-calculated values or from values measured during a reference measurement. For example, the retrieval rate of the fluid from the two cryogenic containers may be measured during retrieval, or there may simply be used an operating time of the system.

The system according to the invention may be implemented in a particularly simple manner in that the system comprises a first valve in the first retrieval line and a second valve in the second retrieval line, and wherein the control unit is configured to control the valves in order to adjust the first and the second mass flow. This enables a particularly simple construction of the system and in particular also a retrofitting of already existing systems.

In the embodiments mentioned, it is preferred that the system comprises a measuring device, which is configured to measure a current volume of the fluid and/or a current operating pressure of the fluid in the first cryogenic container and/or in the second cryogenic container and to send this to the control unit. This makes it possible to determine the hold time of the two cryogenic containers particularly accurately.

Further preferably, the container volumes may be stored in a database that can be queried by the control unit. This may be of advantage, for example, if the hold time is directly calculated. In some embodiments, however, the storage of the container volumes is not necessary, for example if reference values of the hold time are available.

Advantageous and non-limiting embodiments of the invention are explained in greater detail below by way of the drawings.

Figure 1:
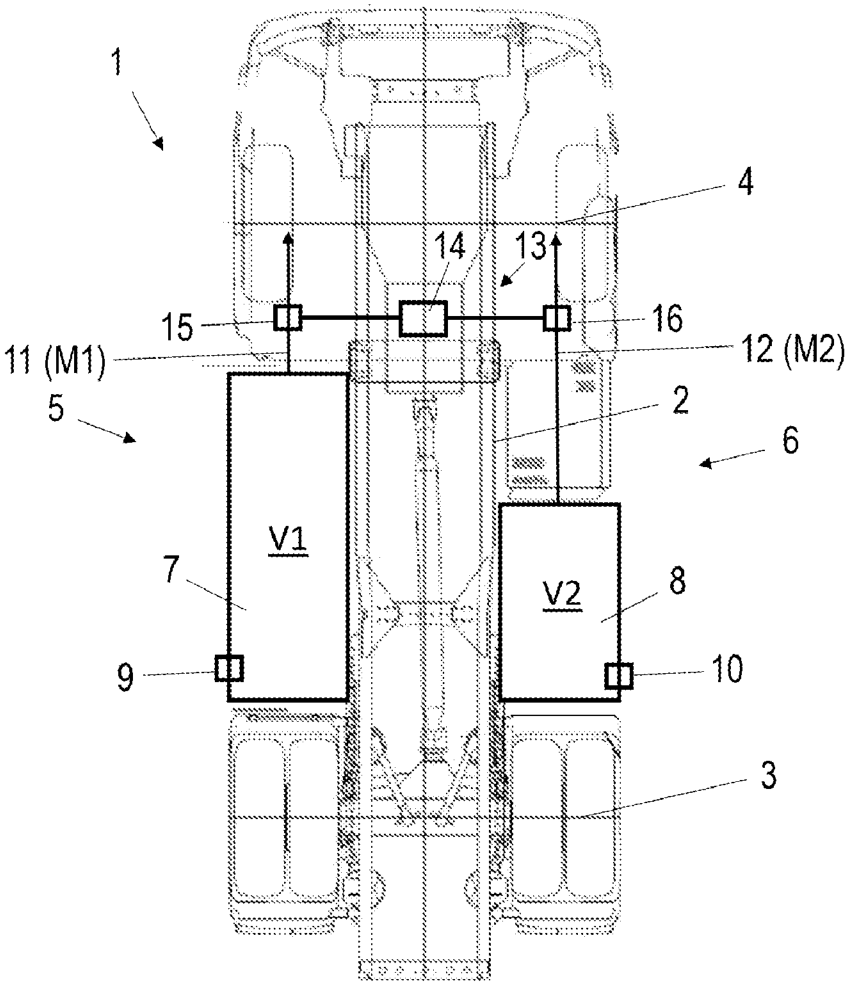
FIG. 1 shows a motor vehicle, on which the system according to the invention is mounted.

FIG. 1 shows a motor vehicle 1 having a support frame 2 and two axles 3, 4. A cryogenic container 7, 8 is mounted on each side 5, 6 of the support frame 2 between the axles 3, 4. The cryogenic containers 7, 8 each store fluid, for example liquefied natural gas, which has also been known to those skilled in the art as LNG ("Liquid Natural Gas"). The fluid is present in the cryogenic containers 7, 8 in both liquid as well as gaseous state. If the cryogenic containers 7, 8 are used in connection with a motor vehicle 1, the stored fluid may, for example, serve as fuel for an engine of the motor vehicle 1. In other embodiments, however, the cryogenic containers 7, 8 could also be provided in other fields of application.

In the present system 1, the first cryogenic container 7 has a container volume V1, which is larger than a container volume V2 of the second cryogenic container 8. Such configurations may be useful, for example, if different amounts of installation space are available on the two sides 5, 6 of the motor vehicle 1.

When the system 1 is in operation, the pressure in the cryogenic containers 7, 8 is, for example, between 6 and 8 bar. This pressure may be regulated, for example, by retrieving fluid or by a heat exchanger projecting into the respective cryogenic container. However, as soon as the system 1 is no longer in operation, i.e. is switched off, the pressure in the cryogenic containers 7, 8 will increase steadily due to a constant heat input into the cryogenic containers 7, 8.

In order to prevent excessive pressure in the cryogenic containers 7, 8 and thus failure thereof, both the first cryogenic container 7 and the second cryogenic container 8 each have a pressure control valve 9, 10, which is connected directly or indirectly to the respective cryogenic container 7, 8 via a connection line. The pressure control valves 9, 10 are activated at a predetermined pressure, which is for example 16 bar, thereby discharging fluid in a gaseous state. Usually, both pressure control valves 9, 10 are activated at the same predetermined pressure, wherein there may also be provided that they may be activated at different pressures.

The period of time from the termination of retrieval until the point of time when the pressure in the cryogenic container 7, 8 reaches a predefined threshold value is referred to as the so-called hold time. It is understood that the hold time of the two cryogenic containers 7, 8 should be as high as possible, as discharged fluid represents an economic loss and an environmental impact.

The hold time of the respective cryogenic container 7, 8 is calculated, among other things, from the container volume V1, V2, as a larger container surface also means a larger heat input. Furthermore, the hold time depends on the current volume of fluid in the cryogenic container 7, 8 and the pressure difference between the activation pressure of the respective pressure control valve 9, 10 and the operating pressure present in the respective cryogenic container 7, 8 at the point of termination of retrieval. For the calculation of the hold time, there may be assumed a predetermined ambient temperature of the cryogenic containers 7, 8 or a predetermined heat input into the cryogenic container 7, 8, respectively. However, the ratio of the hold time of the two cryogenic containers 7, 8 depends only insignificantly on the ambient temperature.

Figure 2:
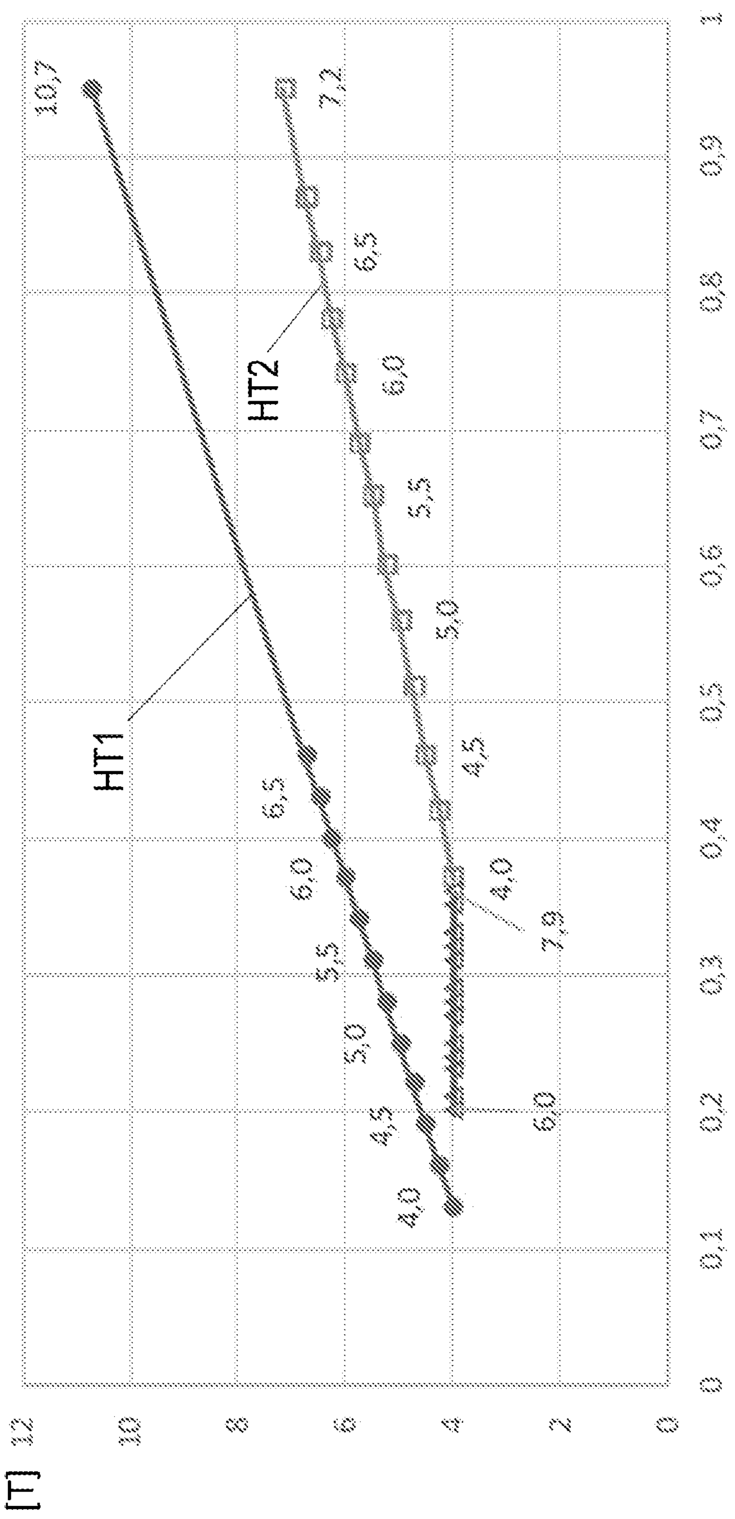
FIG. 2 shows a diagram, in which the hold time is plotted in relation to a current container fill level of two different cryogenic containers.

FIG. 2 shows a diagram, in which the current volume of fluid in relation to the total container volume is plotted on the horizontal axis and the hold time in days on the vertical axis. HT1 presents the course of the hold time of a first cryogenic container 7 having a container volume V1 of 5001 l. HT2 presents the course of the hold time of a cryogenic container 8 having a container volume V2 of 300 l. It is obvious that the first cryogenic container 7 having the larger container volume V1 has a longer hold time than the second cryogenic container 8 having the smaller container volume V2 at the same fill level. In the example depicted, a minimum hold time of four days was selected.

In order to retrieve fluid from the cryogenic containers 7, 8 for operation, the system 1 comprises a first retrieval line 11 connecting to the first cryogenic container 7 for retrieving a first mass flow M1 of fluid as well as a second retrieval line 12 connecting to the second cryogenic container 8 for retrieving a second mass flow M2 of fluid.

The system 1 according to the invention comprises means 13, which are configured to establish the two mass flows M1, M2 of different dimensions. This is used with the aim of reaching a possibly long time following the termination of retrieval, at which one of the two pressure control valves 9, 10 will be activated. This is achieved when the hold time of the two cryogenic containers 7, 8 is essentially equal during retrieval.

The means 13 may, for example, be configured as a control unit 14, which controls the mass flows M1, M2. This may be achieved, for example, via valves 15, 16, which are arranged in each of the retrieval lines 11, 12 and are controlled by the control unit 14. In alternative embodiments, however, the means 13 may also comprise only a rigid throttle in one of the retrieval lines 11, 12.

In order to determine how large the mass flows should be in the first or second operational mode, respectively, the control unit 14 may comprise a computing unit, which is configured to calculate the current hold time of the first and/or of the second cryogenic container 7, 8. For this purpose, the system 1 may in particular comprise a measuring device, which is configured to measure a current volume of the fluid and/or a current operating pressure of the fluid in the first cryogenic container 7 and/or in the second cryogenic container 8 and to send this to the control unit 14. Other values could also be measured and sent to the control unit 14 in order to control the mass flows M1, M2 even more efficiently.

Alternatively, the control unit 14 may also carry out the control of the mass flows M1, M2 without direct measurements of the fluid in the cryogenic containers 7, 8, for example by controlling the mass flows M1, M2 according to a predetermined scheme, for example also depending on the retrieval time or an expected retrieval volume, respectively, of the fluid.

The system 1 may be operated in a first operational mode and/or in a second operational mode by way of the means 13 mentioned, by way of which the mass flows M1, M2 may be established of different sizes. In the first operational mode, the mass flows M1, M2 are adjusted in such a way that the hold time of the two cryogenic containers 7, 8 converges. In the second operational mode, the mass flows M1, M2 may be adjusted such that the hold time of the two cryogenic containers 7, 8 decreases substantially at the same rate when the hold times of the two cryogenic containers 7, 8 are substantially equal.

In principle, there might be provided that the system 1 is only operated in the first or only in the second operational mode. For example, if the system 1 is only operated in the first operational mode and the mass flows M1, M2 are set to the same value after reaching an equal hold time, the hold time will again diverge. In some cases, however, this divergence may be accepted, for example if a simplified control is to be achieved. The system 1 could also be reset to the first operational mode if the divergence exceeds a threshold value.

If the system 1 is configured to be operated in both the first and second operational condition, the system 1 is preferably first operated in the first operational condition until the hold time of the two cryogenic containers 7, 8 is substantially equal. Thereafter, the system 2 is operated in the second operational condition such that the hold time of the two cryogenic containers 7, 8 decreases substantially at the same rate. If the hold time of the two cryogenic containers 7, 8 deviates again, for example due to external influences, it is possible to switch back to the first operational mode until the hold time of the two cryogenic containers 7, 8 is again of an equal dimension and then switch to the second operational mode.

As a rule, fluid is retrieved in the first and/or in the second operational condition in the liquid phase in order to achieve the highest possible power. Fluid, however, may also be retrieved in the gaseous phase in the first and/or second operational condition, whereby an economiser function may be achieved, for example. When setting the mass flows M1, M2, the control unit 14 may also select whether fluid is to be retrieved in the gaseous phase or in the liquid phase in order to achieve a converging or constant, respectively, hold time.

With regard to FIG. 2, this will now be explained by way of a practical example. If both cryogenic containers 7, 8 are full, fluid would first be retrieved only from the 500 l cryogenic container 7 until this has a remaining hold time of 7.2 days corresponding to the hold time of the full 300 l cryogenic container 8. In general, however, even in the first operational mode, just enough fluid, preferably in the gaseous phase, may be retrieved from the small cryogenic container 8 to keep the pressure therein constant, thus achieving a maximum hold time of this cryogenic container 8.

For example, a full cryogenic container 7 with 500 l holds approx. 160 kg of LNG. A 300 l cryogenic container 8, on the other hand, holds approx. 95 kg of LNG. In the first operational mode, the first 65 kg are only retrieved from the 500 l cryogenic container 7. During this time, just enough is retrieved from the 300 l cryogenic container 8 to keep the pressure constant.

If the travel is continued after the 65 kg of LNG have been retrieved, there will take place a switch into the second operational mode and the retrieval rates of the two cryogenic containers 7, 8 will be adjusted such that both cryogenic containers 7, 8 have the same remaining hold time.

Subsequently, the hold time is reduced by one day if approx. 18.5 kg LNG is removed from the 500 l cryogenic container 7 and approx. 16.7 kg LNG is retrieved from the 300 l cryogenic container 8. Thus, while complying with this retrieval ratio, the 500 l cryogenic container 7 may be operated up to a residual quantity of approx. 34 kg LNG (fill level 13%) and the 300 l cryogenic container 8 up to a residual quantity of 42 kg (fill level 37%). At these fill levels, the minimum hold time of four days is achieved.

In total, this results in a usable LNG content of 160 kg-34 kg=126 kg for the 500 l cryogenic container 7. For the 300 l cryogenic container 8, this results in a usable LNG content of 95 kg-42 kg=53 kg. In total, the system 1 has a usable LNG content of 126 kg+53 kg=179 kg.

Without adjusting the mass flows M1, M2, only two times 53 kg=106 kg may be used for the remaining hold time of four days, as each additional mass retrieved reduces the hold time of the smaller cryogenic container 8 to fewer than four days.

A further increase of the usable cryogenic container content may be achieved if, furthermore, a third operational state is provided. In this case, the smaller cryogenic container 8 may be reduced to a lower pressure in order to achieve a hold time of four days again due to the larger pressure interval thus created. This is possible if, towards the end of the planned travel, the motor in part-load operation is supplied with lower pressures from the smaller cryogenic container 8. For this purpose, the fuel must be retrieved either from the one or the other cryogenic container 7, 8, since a simultaneous retrieval would lead to a pressure balance between the cryogenic containers 7, 8. In order to control from which cryogenic container 7, 8 fluid is retrieved, a travel distance profile may be used, which may be read from a pre-recorded map, for example.

If, for example, the pressure of the 300 l cryogenic container is reduced from 8 bar to 6 bar in the third operational mode, the residual mass for 4 days hold time is reduced by 16 kg from 42 kg to 26 kg and the total usable mass increases from 179 kg to 195 kg.

The third operational mode may either be controlled by the control unit 14 mentioned above or by a separate control unit, which may be connected to the control unit 14 mentioned above. In particular, heat exchangers that project into the respective cryogenic container 7, 8 may be controlled to set the pressure.

There could also be provided a fourth operational mode, which is selected, for example, as a start mode when the pressure in one or in both cryogenic containers 7, 8 is above a desired operating pressure. In prior art, as much fluid as possible is retrieved from both cryogenic containers 7, 8 for this purpose such that the operating pressure is reached as quickly as possible. In the present fourth operational mode, the mass flows M1, M2 in this fourth operational mode may be of different dimensions, on the one hand, in order to reach the operating pressure quickly, but, on the other hand, also in order to achieve a converging or constant, respectively, hold time. In the fourth operational mode, fluid is usually retrieved in the gaseous phase. However, fluid could also be retrieved in the liquid phase if this helps to achieve a converging or constant, respectively, hold time.

In further embodiments, the cryogenic containers 7, 8 may also have the same volume V1, V2. Setting different mass flows M1, M2 may be advantageous if the fill level of the two cryogenic containers is of a different dimension, as this will result in a different hold time of the two cryogenic containers 7, 8. In embodiments with cryogenic containers 7, 8 of different dimensions, there is usually not provided a second operational mode, i.e. in some embodiments the second operational mode is only provided if the cryogenic containers have a different container volume V1, V2.

The invention claimed is:

1. A system for providing a fluid, comprising at least a first and a second cryogenic container for storing the fluid, wherein the system comprises a first retrieval line connecting to the first cryogenic container for retrieving a first mass flow of fluid and a second retrieval line connecting to the second cryogenic container for retrieving a second mass flow of fluid, characterized in that the system comprises means, which are configured to make a first mass flow and a second mass flow of a different magnitude such that in a first operational mode a hold time of the first cryogenic container and the second cryogenic container converges upon retrieval and/or in a second operational mode the hold time of the first cryogenic container and the second cryogenic container essentially decreases at the same rate if the hold times of the first cryogenic container and the second cryogenic container are essentially equal, wherein the hold time is a period of time from a termination of retrieval until a point of time, when the pressure in the first or the second cryogenic container reaches a predefined threshold.

2. The system according to claim 1, wherein the first cryogenic container has a container volume, which is larger than a container volume of the second cryogenic container.

3. The system according to claim 1, wherein the first cryogenic container has a container volume, which is equal to a container volume of the second cryogenic container, wherein the retrieval lines have a different flow resistance.

4. The system according to claim 1, wherein the means comprise a control unit, which is configured to regulate the first mass flow and/or the second mass flow.

5. The system according to claim 4, wherein the control unit is configured to retrieve in the first operational mode fluid only from the first cryogenic container until the hold time of the first cryogenic containers substantially corresponds to the hold time of the second cryogenic container.

6. The system according to claim 4, wherein the control unit is configured to retrieve in the first operational mode only an amount of fluid from the second cryogenic container such that the hold time of the second cryogenic container remains constant and to retrieve the remaining fluid from the first cryogenic container.

7. The system according to claim 6, wherein the system is configured to retrieve in the first operational mode fluid only in a gaseous state from the second cryogenic container.

8. The system according to claim 1, wherein the control unit is configured to switch from the first into the second operational mode upon reaching the same hold time of the first cryogenic container and the second cryogenic containers for the first time.

9. The system according to claim 4, wherein the control unit is configured to select, when retrieving the fluid from the first and/or the second cryogenic container, between a retrieval of the fluid in a liquid phase and/or a retrieval of the fluid in a gaseous phase.

10. The system according to claim 4, wherein the system is operated in a third operational mode and wherein the system in the third operational mode is configured to establish during operation a different operating pressure in the first cryogenic container and the second cryogenic container and to retrieve fluid only from the first or only from the second cryogenic container.

11. The system according to claim 4, wherein the system is operated in a fourth operational mode if the pressure in the first cryogenic container and the second cryogenic container lies between an operating pressure and the predefined threshold and wherein the system in the fourth operational mode is configured to select the first mass flow and the second mass flow in such a way that the pressure in the first cryogenic container and the second cryogenic container is reduced to the operating pressure and, thereby, the hold time of the first cryogenic container and the second cryogenic container converges and/or increased essentially at the same rate upon retrieval.

12. The system according to claim 11, wherein fluid in the fourth operational mode is only retrieved in the gaseous phase from the first cryogenic container and the second cryogenic container.

13. The system according to claim 4, wherein the control unit comprises a computing unit, which is configured to calculate the current hold time of the first and/or of the second cryogenic container.

14. The system according to claim 4, wherein the system comprises a first valve in the first retrieval line and a second valve in the second retrieval line, and wherein the control unit is configured to control the first valve and the second valve to adjust the first mass flow and the second mass flow.

15. The system according to claim 4, wherein the system comprises a measuring unit, which is configured to measure a current fill level of the fluid and/or a current operating pressure of the fluid in the first cryogenic container and/or in the second cryogenic container and to send the measured current fill level and/or the measured current operating pressure to the control unit.

* * * * *